United States Patent
Komoriya et al.

(10) Patent No.: US 7,060,771 B2
(45) Date of Patent: Jun. 13, 2006

(54) TRANSPARENT FLUORINE-CONTAINING COPOLYMER

(75) Inventors: Haruhiko Komoriya, Saitama (JP); Sunao Koga, Saitama (JP); Kentaro Tsutsumi, Saitama (JP); Kazuhiko Maeda, Tokyo (JP)

(73) Assignee: Central Glass Company, Limited, Ube (JP)

( * ) Notice: Subject to any disclaimer, the term of this patent is extended or adjusted under 35 U.S.C. 154(b) by 77 days.

(21) Appl. No.: 10/178,781

(22) Filed: Jun. 25, 2002

(65) Prior Publication Data

US 2003/0236369 A1 Dec. 25, 2003

(51) Int. Cl.
*C08F 118/20* (2006.01)

(52) U.S. Cl. .................. 526/245; 526/246; 526/320; 526/332

(58) Field of Classification Search ............. 526/245, 526/246, 320, 332
See application file for complete search history.

(56) References Cited

U.S. PATENT DOCUMENTS

| 4,609,715 | A | * | 9/1986 | Koishi et al. ............ 526/245 |
| 4,613,657 | A | | 9/1986 | Narita et al. |
| 5,136,002 | A | * | 8/1992 | Sugimori et al. ......... 526/247 |
| 5,406,641 | A | * | 4/1995 | Bigley et al. ............ 385/141 |
| 6,383,620 | B1 | * | 5/2002 | Aoyama et al. .......... 428/212 |
| 2002/0042470 | A1 | * | 4/2002 | Moore et al. ............ 524/544 |

FOREIGN PATENT DOCUMENTS

| EP | 0073087 | 3/1983 |
| JP | 60-42352 | 3/1985 |
| JP | 60-42411 | 3/1985 |
| JP | 63-18964 | 4/1988 |
| JP | 63-238115 | 10/1988 |
| JP | 4-19247 | 3/1992 |

OTHER PUBLICATIONS

Aglietto et al., "Synthesis of New Polymers Containing α–(trifluoromethyl)–acrylate Units", *Macromol. Chem. Phys.*, No. 196 (1995), pp. 2843–2853.

Ito et al., "Polymerization of Methyl α–(Trifluoromethyl)acrylate and α–(Trifluoromethyl)acrylonitrile and Copolymerization of These Monomers with Methyl Methacrylate", *Macromolecules*, No. 15 (1982), pp. 915–920.

Pearce et al., "Polymer Compatibilization Through Hydrogen Bonding", *J. Macromol. Sci–Chem.*, A21 (1984), pp. 1181–1216.

Kluge et al., "Synthesis of Prostaglandin Models and Prostaglandins by Conjugate Addition of a Functionalized Organocopper Reagent", *Journal of the American Chemical Society*, vol. 94, No. 22 (1972), pp. 7827–7832.

* cited by examiner

*Primary Examiner*—Bernard Lipman
(74) *Attorney, Agent, or Firm*—Crowell & Moring LLP

(57) ABSTRACT

The present invention relates to a fluorine-containing copolymer. This fluorine-containing copolymer includes (a) a first unit derived from α-trifluoromethyl acrylic ester represented by the following general formula (1); and (b) a second unit derived from a vinyl monomer,

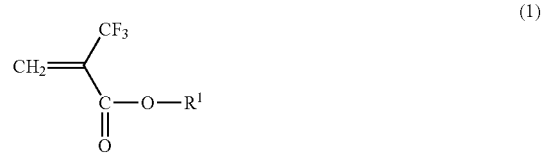

(1)

where $R^1$ is an organic group containing at least one fluorine atom.

5 Claims, No Drawings

TRANSPARENT FLUORINE-CONTAINING COPOLYMER

BACKGROUND OF THE INVENTION

The present invention relates to transparent polymer compounds, particularly to transparent polymer compounds containing fluorine atom in their molecules. Such polymer compounds are useful as a material for plastic optical fibers and optical waveguides, particularly as core, cladding and covering materials of plastic optical fibers and optical wave guides.

In general, fluorine-containing polymer compounds are used for various fields, since they are superior in heat resistance, chemical resistance and electrical characteristics. However, conventional fluorine-containing polymer compounds (e.g., tetrafluoroethylene, vinylidene fluoride and chlorotrifluoroethylene), which are prepared by polymerizing fluorine-containing vinyl monomers, usually contain a crystalline component, making light scattering and thereby causing low transparency. Therefore, such fluorine-containing polymer compounds have almost not been used in an optical field requiring high transparency. However, fluorine-containing polymer compounds themselves are specifically low in refractive index and low in light absorption in a wide wavelength range due to their fluorine atom properties. Therefore, fluorine-containing polymer compounds have a potential for becoming a very useful material in optical fields.

There are several proposals for improving fluorine-containing polymer compounds in transparency. Japanese Patent Laid-open Publication Showa 63-238115 discloses a process for producing a copolymer (containing a cyclic structure in its main chain) by a radical copolymerization between a perfluoroether having an end double bond and another monomer capable of radical copolymerization. The resulting copolymer shows a higher transparency, as compared with conventional fluorine-containing polymer compounds such as polytetrafluoroethylene and polyvinylidene fluoride. Japanese Patent Examined Publication Showa 63-18964, corresponding to EP 0073087A, discloses an amorphous copolymer comprising perfluoro-2,2-dimethyl-1,3-dioxol, tetrafluoroethylene and optionally at least one another ethylene-type unsaturated monomer. However, there still exist needs for such fluorine-containing polymer compounds to have a sufficient solubility in common solvents and to have an improved adhesion to other materials.

Acrylic or methacrylic ester-based polymers are widely used as optical materials. In recent years, there have been proposals for introducing fluorine atom into such polymers and the use of the resulting polymers as optical materials. Polyacrylicfluoroalkylester resins are considered to have acrylic resin properties and fluororesin properties. It is possible to change the fluorine content of such resins by changing the type of the fluoroalkyl group of the monomer (raw material). However, in the case of increasing the fluorine content by using a longer fluoroalkyl side chain, the resulting resins may have a lower glass transition point and a lower adhesion to various substrates. If the fluoroalkyl side chain has a carbon atom number greater than 6, the glass transition point may increase due to the crystallization of this side chain. The resulting resins may become inferior in transparency. As mentioned hereinabove, although it is possible to lower refractive index by introducing many fluorine atoms into an alkyl side chain of the acrylic ester, the resulting resins may become inferior in other properties.

Macromol. Chem. Phys. 196, 2840–2853 (1995) discloses (a) a synthesis of a homopolymer from an α-trifluoromethylacrylic acid or α-trifluoromethylacrylic methyl ester, (b) a synthesis of a copolymer by copolymerizing α-trifluoromethylacrylic methyl ester and a vinyl ether such as butyl vinyl ether or methyl vinyl ether; and (c) a synthesis of a copolymer by copolymerizing α-trifluoromethylacrylic methyl ester and α-olefin such as 1-decene.

Macromolecules 1982, 15, 915–920 discloses a homopolymer of α-trifluoromethylacrylicmethyl ester, and a copolymer of α-trifluoromethylacrylicmethyl ester and methyl methacrylate.

Japanese Patent Examined Publication Heisei 4-19247, corresponding to U.S. Pat. No. 4,613,657, discloses a production of homopolymers of α-trifluoromethylacrylictrifluoroethyl ester and α-trifluoromethylacrylichexafluoroisopropyl ester by anionic polymerization.

SUMMARY OF THE INVENTION

It is an object of the present invention to provide a polymer compound that is low in light scattering and light absorption that is useful as a material for plastic optical fibers and optical waveguides, and that is high in transparency.

According to the present invention, there is provided a fluorine-containing copolymer comprising:

a first unit derived from α-trifluoromethyl acrylic ester represented by the following general formula (1); and a second unit derived from a vinyl monomer,

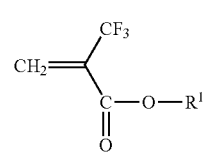

(1)

where $R^1$ is an organic group containing at least one fluorine atom.

DESCRIPTION OF THE PREFERRED EMBODIMENTS

The inventors unexpectedly found that the fluorine-containing copolymer according to the present invention is high in transparency, can be dissolved in common organic solvents (e.g., acetone and methyl isobutyl ketone), and is superior in thermal workability. Thus, this copolymer can be shaped into a desired form, for example, by coating, molding or spinning. The copolymer is a useful material in the field of optical communication, as a base component of optical adhesives for assembling optical parts, and as a base component of photosensitive resins showing transparency in a wide range of from a short wavelength band (about 120 nm) to a long wavelength band (about 1.5 μm).

As shown by the general formula (1), α-trifluoromethylacrylic ester, which may be referred to as "monomer (A)" hereinafter, contains at least one fluorine atom in its ester moiety (i.e., $R^1$).

In the general formula (1), $R^1$ represents an organic group containing at least one fluorine atom. Examples of such organic group are $C_1$–$C_{20}$ fluoroalkyl groups, $C_2$–$C_{20}$ fluoroalkenyl groups, $C_6$–$C_{20}$ fluoroaryl groups, $C_3$–$C_{20}$ fluororocycloalkyl groups, $C_4$–$C_{20}$ fluorocyclodienyl groups, and 5- to 10-membered fluoroheterocyclic groups containing at least one hetero atom (nitrogen, oxygen or sulfur) in the molecule. These exemplary groups optionally have substituents (e.g., alkyl group, fluoroalkyl groups, cycloalkyl groups, cyclofluoroalkyl groups, aryl groups, fluorine-containing aryl groups, heterocyclic groups, and fluorine-containing heterocyclic groups). The fluorocycloalkyl group may have a monocyclic structure or a polycyclic structure such as that originating from bicyclo[2.2.1]heptane or tetracyclo[$4.4.0.1^{2,5}.1^{7,10}$]dodecane. The monomer (A) may be a mixture of two different α-trilfuoromethylacrylic esters represented by the general formula (1).

Concrete examples of the organic group ($R^1$) are 2,2,2-trifluoroethyl group, 1H, 1H-pentafluoropropyl group, 1H, 1H-heptafluorobutyl group, 3,3,4,4,5,5,5-heptafluoro-2-pentyl group, hexafluoroisopropyl group, 1H, 1H-pentadecafluorooctyl group, 3,4,4,4-pentafluoro-2-butyl group, 1,1,1-trifluoro-2-propyl group, 1H, 1H, 7H-dodecafluoroheptyl group, 1H, 1H, 11H-eicosafluoroundecyl group, 1H, 1H, 5H-octafluoropentyl group, 1H, 1H, 3H-tetrafluoropropyl group, 4,4,4-trifluorobutyl group, 2-methyl-3,3,3-trifluoromethylpropyl group, 2-pentafluorophenyl-1-propyl group, 3-pentafluorophenyl-1-propyl group, 1H, 1H-2-trifluoromethyl-tetrafluoropropyl group, 1H, 1H, 3H-2-trifluoromethyl-trifluoropropyl group, 1H, 1H, 3H-hexafluorobutyl group, 1H, 1H, 2H-2-methyl-tridecafluoro-1-octyl group, and 1H, 1H, 2H, 2H, 3H, 3H-tridecafluorononyl group. Of these, 2,2,2-trifluoroethyl group and hexafluoroisopropyl group are particularly preferable.

The method for producing the α-trilfuoromethylacrylic ester is not particularly limited. For example, Japanese Patent Laid-open Publication Showa 60-42352 discloses a method for producing trifluoroethyl-α-trilfuoromethylacrylate by mixing together α-trifluoromethylacrylic acid and 2,2,2-trifluoroethanol at 90° C. and then by dropping 20% fuming sulfuric acid to conduct the reaction, followed by distillation. This publication also discloses a similar method for producing hexafluoroisopropyl-α-trifluoromethylacrylate by using hexafluoroisopropanol.

Preferable examples of the vinyl monomer (hereinafter may be referred to as "monomer (B)") used in the invention are α-olefins, cyclic olefins, vinyl ethers, allyl ethers, allyl esters, vinyl esters, and styrene monomers (including styrene derivatives).

Concrete examples of the α-olefin used as the monomer (B) are $C_1$–$C_{20}$ α-olefins such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetracene, 1-hexadecene, 1-octadecene, and 1-eicocene; and $C_3$–$C_{20}$ cyclic olefins (such as cyclopropene, cyclobutene, cyclopentene, cyclohexene, cycloheptene, cyclooctene, cyclononene, cyclodecene and norbornene) and their derivatives.

Concrete examples of the vinyl ether used as the monomer (B) are methyl vinyl ether, ethyl vinyl ether, propyl vinyl ether, isopropyl vinyl ether, butyl vinyl ether, isobutyl vinyl ether, sec-butyl vinyl ether, t-butyl vinyl ether, pentyl vinyl ether, β-chloroethyl vinyl ether, isoamylcyclohexyl vinyl ether, hexyl vinyl ether, phenyl vinyl ether, octyl vinyl ether, 2-ethylhexyl vinyl ether, decyl vinyl ether, cyclohexyl vinyl ether, methylcyclohexyl vinyl ether, benzyl vinyl ether, phenethyl vinyl ether, and tolyl vinyl ether. Further examples of the vinyl ether are fluoroalkyl vinyl ethers such as 1,1,1-trifluoroethyl vinyl ether, 2,2-difluoroethyl vinyl ether, tetrafluoroethyl vinyl ether, 2,2,3,3-tetrafluoropropyl vinyl ether, 2,2,3,3,4,4,5,5-octafluoropentyl vinyl ether, and 2,2,3,3,4,4,5,5,6,6,7,7,8,8,9,9-hexadecafluorononyl vinyl ether.

The monomer (B) may be a perfluoroalkyl vinyl ether represented by the following general formula (2):

$$CF_2=CF(OR^2) \quad (2)$$

where $R^2$ is a perfluoroalkyl group. Examples of such perfluoroalkyl vinyl ether are perfluoromethyl vinyl ether, perfluoroethyl vinyl ether, perfluoropropyl vinyl ether, perfluoroisopropyl vinyl ether, perfluorobutyl vinyl ether, perfluoroisobutyl vinyl ether, perfluoro-sec-butyl vinyl ether, perfluoro-t-butyl vinyl ether, perfluoropentyl vinyl ether, perfluorohexyl vinyl ether, perfluorooctyl vinyl ether, and perfluorododecyl vinyl ether.

Further examples of the monomer (B) are hydroxyl group-containing vinyl ethers such as hydroxymethyl vinyl ether, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, diethylene glycol monovinyl ether, polyethylene glycol monovinyl ether, and 1,4-cyclohexanedimethanol vinyl ether.

Further examples of the monomer (B) are allyl ethers such as methyl allyl ether, ethyl allyl ether, propyl allyl ether, butyl allyl ether, benzyl allyl ether, and cyclohexyl allyl ether. The monomer (B) may be a hydroxyl group-containing allyl ether. Its examples are alkylene glycol monoallyl ethers such as ethylene glycol monoallyl ether, propylene glycol monoallyl ether, diethylene glycol monoallyl ether, polyethylene glycol monoallyl ether, and hydroxybutyl allyl ether; and polyhydric alcohol allyl ethers such as allyl alcohol and glycerol monoallyl ether.

Furthermore, the monomer (B) may be selected from monomers having various functional groups. Examples of such monomers are epoxy group-containing vinyl ethers and allyl ethers, allyl acetoacetate as a β-ketoester group-containing vinyl ether or allyl ether, and hydrolysable group-containing and silicon-containing vinyl ethers such as trimethoxy vinyl ether.

Further examples of the monomer (B) are compounds represented by the general formula (3)

$$CH_2=CHOCOR^3 \quad (3)$$

wherein $R^3$ is a hydrogen atom, $C_1$–$C_{20}$ alkyl group, $C_2$–$C_{20}$ alkenyl group, $C_6$–$C_{20}$ aryl group, $C_3$–$C_{20}$ cycloalkyl group, $C_4$–$C_{20}$ cyclodienyl group, 5–10 membered heterocyclic group containing at least one hetero atom selected from nitrogen, oxygen and sulfur, $C_1$–$C_{20}$ halogenated alkyl group, $C_2$–$C_{20}$ halogenated alkenyl group, $C_6$–$C_{20}$ halogenated aryl group, $C_3$–$C_{20}$ halogenated cycloalkyl group, $C_4$–$C_{20}$ halogenated cyclodienyl group, or 5–10 membered halogenated heterocyclic group containing at least one hetero atom selected from nitrogen, oxygen and sulfur. Each of these halogenated groups contains at least one halogen atom selected from fluorine, chlorine, bromine and iodine. Each of the cycloalkyl group and the halogenated cycloalkyl group may have a monocyclic structure or a polycyclic structure such as that is originating from bicyclo[2.2.1]heptane or tetracyclo[$4.4.0.1^{2,5}.1^{7,10}$]dodecane. Each of the above groups may have a substituent selected from alkyl groups, cycloalkyl groups, aryl groups, heterocyclic groups, Each of these four groups may contain at least one halogen atom (selected from fluorine, chlorine, bromine and iodine) substituted for at least one hydrogen atom.

Further examples of the monomer (B) are vinyl esters having no functional groups, such as vinyl formate, vinyl acetate, vinyl trifluoroacetate, vinyl chloroacetate, vinyl dichloroacetate, vinyl propionate, vinyl butyrate, vinyl isobutyrate, vinyl crotonate, vinyl trimethylacetate, vinyl caproate, vinyl isocaproate, vinyl pivalate, vinyl caprylate, vinyl pelargonate, vinyl caprylate, vinyl laurate, vinyl myristate, vinyl palmitate, vinyl stearate, vinyl oleate, neo-nonanoic acid ethenyl ester (e.g., VEOVA-9 (trade name) of Showa-Shell Chem. Co.), neodecanoic acid ethenyl ester (e.g., VEOVA-10 (trade name) of Showa-Shell Chem Co.), vinyl cyclohexanate, vinyl benzoate, vinyl p-toluiate, and vinyl p-tert-butylbenzoate.

Further examples of the monomer (B) are vinyl esters having functional groups, such as carboxylates such as hydroxyethyl crotonate and hydroxybutyl crotonate, and monovinyl dicarboxylates such as monovinyl succinate, monovinyl adipicate, monovinyl sebacate and monovinyl cyclohexanedicarboxylate.

The monomer (B) may be a compound selected from acrylic and methacrylic acids and their esters. This compound is represented by the following general formula (4):

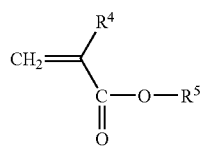

(4)

wherein $R^4$ is a hydrogen atom or methyl group, and $R^5$ is a hydrogen atom, $C_1$–$C_{20}$ alkyl group, $C_2$–$C_{20}$ alkenyl group, $C_6$–$C_{20}$ aryl group, $C_3$–$C_{20}$ cycloalkyl group, $C_4$–$C_{20}$ cyclodienyl group, 5–10 membered heterocyclic group containing at least one hetero atom selected from nitrogen, oxygen and sulfur, $C_1$–$C_{20}$ halogenated alkyl group, $C_2$–$C_{20}$ halogenated alkenyl group, $C_6$–$C_{20}$ halogenated aryl group, $C_3$–$C_{20}$ halogenated cycloalkyl group, $C_4$–$C_{20}$ halogenated cyclodienyl group, or 5–10 membered halogenated heterocyclic group containing at least one hetero atom selected from nitrogen, oxygen and sulfur. Each of these halogenated groups contains at least one halogen atom selected from fluorine, chlorine, bromine and iodine. Each of the cycloalkyl group and the halogenated cycloalkyl group may have a monocyclic structure or a polycyclic structure such as that originating from bicyclo[2.2.1]heptane or tetracyclo[4.4.0.1$^{2,5}$.1$^{7,10}$]dodecane. Each of the above groups may have a substituent selected from alkyl groups, cycloalkyl groups, aryl groups, heterocyclic groups. Each of these four groups may contain at least one halogen atom (selected from fluorine, chlorine, bromine and iodine) substituted for at least one hydrogen atom.

The monomer (B) may be selected from (meth)acrylic esters (i.e., acrylic esters and methacrylic esters) such as methyl acrylate, ethyl acrylate, butyl acrylate, isobutyl acrylate, ter-butyl acrylate, cyclohexyl acrylate, ethylhexyl acrylate, n-octyl acrylate, isooctyl acrylate, nonyl acrylate, tridecyl acrylate, lauryl acrylate, benzyl acrylate, isobornyl acrylate, methyl methacrylate, ethyl methacrylate, butyl methacrylate, isobutyl methacrylate, ter-butyl methacrylate, cyclohexyl methacrylate, ethylhexyl methacrylate, n-octyl methacrylate, isooctyl methacrylate, nonyl methacrylate, tridecyl methacrylate, lauryl methacrylate, benzyl methacrylate, and isobornyl methacrylate.

The monomer (B) may be a styrene monomer represented by the following general formula (5):

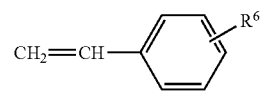

(5)

wherein $R^6$ is a hydrogen atom, $C_1$–$C_{20}$ alkyl group, $C_2$–$C_{20}$ alkenyl group, $C_6$–$C_{20}$ aryl group, $C_3$–$C_{20}$ cycloalkyl group, $C_4$–$C_{20}$ cyclodienyl group, 5–10 membered heterocyclic group containing at least one hetero atom selected from nitrogen, oxygen and sulfur, $C_1$–$C_{20}$ halogenated alkyl group, $C_2$–$C_{20}$ halogenated alkenyl group, $C_6$–$C_{20}$ halogenated aryl group, $C_3$–$C_{20}$ halogenated cycloalkyl group, $C_4$–$C_{20}$ halogenated cyclodienyl group, or 5–10 membered halogenated heterocyclic group containing at least one hetero atom selected from nitrogen, oxygen and sulfur. Each of these halogenated groups contains at least one halogen atom selected from fluorine, chlorine, bromine and iodine. Each of the cycloalkyl group and the halogenated cycloalkyl group may have a monocyclic structure or a polycyclic structure such as that originating from bicyclo[2.2.1]heptane or tetracyclo[4.4.0.1$^{2,5}$.1$^{7,10}$]dodecane. Each of the above groups may have a substituent selected from alkyl groups, cycloalkyl groups, aryl groups, heterocyclic groups. Each of these four groups may contain at least one halogen atom (selected from fluorine, chlorine, bromine and iodine) substituted for at least one hydrogen atom.

The monomer may be a styrene derivative represented by the following general formula (6):

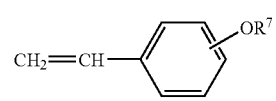

(6)

where $R^7$ is a group that is capable of dissociating by an action of an acid. Examples of $R^7$ are methoxyethoxymethyl group, methoxymethyl group, ethoxymethyl group, cyclopropylmethyl group, benzyl group, ethoxybenzyl group, methylthiobenzyl group, benzyloxymethyl group, methylthiomethyl group, ethylthiomethyl group, benzylthiomethyl group, phenacyl group, methoxyphenacyl group, α-methylphenacyl group, bromophenacyl group, methylthiophenacyl group, propenyl group, 1-methoxyethyl group, 1-methylthioethyl group, 1,1-dimethoxyethyl group, 1-ethoxyethyl group, 1-ethylthioethyl group, 1,1-diethoxyethyl group, 1-phenoxyethyl group, 1-phenylthioethyl group, 1,1-diphenoxyethyl group, 1-benzyloxyethyl group, 1-benzylthioethyl group, 1-cyclopropylethyl group, 1-phenylethyl group, 1,1-diphenylethyl group, 1-methoxycarbonylethyl group, 1-ethoxycarbonylethyl group, 1-n-propoxycarbonylethyl group, 1-isopropoxycarbonylethyl group, 1-n-butoxycarbonylethyl group, 1-t-butoxycarbonylethyl group, p-toluenesulfonyl group, isopropyl group, s-butyl group, suberoyl group, t-butyl group, 1,1-dimethylbutyl group, methoxycarbonylmethyl group, ethoxycarbonylmethyl group, n-propoxycarbonylmethyl group, isopropoxycarbonylmethyl group, n-butoxycarbonylmethyl group, acetyl group, t-butoxycarbonylmethyl group, methoxycarbonyl group, ethoxycarbonyl group, isopropoxycarbonyl group, t-butoxycarbonyl group, butyryl group, heptanoyl group, propioyl group, methacryloyl group, hexanoyl group, valeryl group, isovaleryl group, lauryloyl group, cyclopentyl group, cyclopropyl group, myristoyl group, palmytoyl group, stearoyl group, oxalyl group, scucinyl group, gluallyl group, adipoyl group, propionyl group, piperoyl group, azelaoyl group, sebacoyl group, acryloyl group, crotonoyl group, malonyl group, oleoyl group, maleoyl group, fumaroyl group, mesaconoyl group, benzoyl group, phthaloyl group, isophthaloyl group, terephthaloyl group, naphthoyl group, toluoyl group, hydroatropoyl group, atropoyl group, furoyl group, thenoyl group, nicotinoyl group, isonicotinoyl group, cyclohexyl group, cyclohexenyl group, 4-methoxycyclohexyl group, tetrahydropyranyl group, tetrahydrofuranyl group, tetrahydrothiopyranyl group, tetrahydrothiofuranyl group, 3-bromotetrahydropyranyl group, 4-methoxytetrahydropyranyl group, 4-methoxytetrahydrothiopyranyl group, mesyl group, 3-tetrahydrothiophene-1,1-dioxide, monomethylsilyl group, dimethylsilyl group, trimethylsilyl group, monoethylsilyl group, diethylsilyl group, ethyldimethylsilyl group, methyldiethylsilyl group, triethylsilyl group, monoisopropylsilyl group, diisopropylsilyl group, isopropyldimethylsilyl group, methyldiisopropylsilyl group, triisopropylsilyl group, mono-t-butylsilyl group, di-t-butylsilyl group, t-butyldiimethylsilyl group, methyldi-t-butylsilyl group, tri-t-butylsilyl group, monophenylsilyl group, diphenylsilyl group, phenyldimethylsilyl group, methyldiphenylsilyl group, and triphenylsilyl group.

The monomer (B) may be another styrene derivative that is the same as that represented by the general formula (6), except containing —$R^9$—$OR^7$ substituted for —$OR^7$. $R^9$ is $C_1$–$C_{20}$ alkylene group, $C_2$–$C_{20}$ alkenylene group, $C_6$–$C_{20}$ arylene group, $C_3$–$C_{20}$ cycloalkylene group, $C_4$–$C_{20}$ cyclodienylene group, 5–10 membered, bivalent, heterocyclic group containing at least one hetero atom selected from nitrogen, oxygen and sulfur, $C_1$–$C_{20}$ halogenated alkylene group, $C_2$–$C_{20}$ halogenated alkenylene group, $C_6$–$C_{20}$ halogenated arylene group, $C_3$–$C_{20}$ halogenated cycloalkylene group, $C_4$–$C_{20}$ halogenated cyclodienylene group, or 5–10 membered, bivalent, halogenated heterocyclic group containing at least one hetero atom selected from nitrogen, oxygen and sulfur. Each of these halogenated groups contains at least one halogen atom selected from fluorine, chlorine, bromine and iodine. Each of the above groups may have a substituent selected from alkyl groups, cycloalkyl groups, aryl groups, heterocyclic groups. Each of these four groups may contain at least one halogen atom (selected from fluorine, chlorine, bromine and iodine) substituted for at least one hydrogen atom. Fluorine is particularly preferable among halogens.

$R^9$ is not particularly limited. Its examples are methylene group, ethylene group, n-propylene group, i-propylene group, n-butylene group, i-butylene group, sec-butylene group, t-butylene group, pentylene group, hexylene group, heptylene group, difluoromethylene group, tetrafluoroethylene group, n-perfluoropropylene group, hexafluoroisopropylidene group, n-perfluorobutylene group, i-perfluorobutylene group, sec-perfluorobutylene group, t-perfluorobutylene group, perfluoropentylene group, perfluorohexylene group, and perfluoroheptylene group.

Since the styrene derivative represented by the general formula (6) and the above-mentioned another styrene derivative containing —$R^9$—$OR^7$ substituted for —$OR^7$ have photosensitivity, they can provide the fluorine-containing copolymer of the present invention with photosensitivity. Thus, the fluorine-containing copolymer can serve as a good positive-type photosensitive material by mixing such styrene derivative with an acid generator that generates an acid by an action of light.

The styrene derivative containing —$R^9$—$OR^7$ is preferably one represented by the general formula (7):

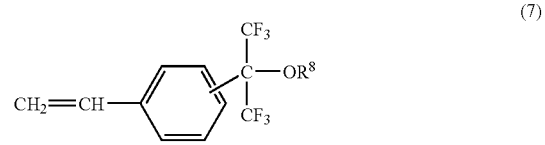

wherein $R^8$ is the same as $R^7$ in the general formula (6). It is more preferably 4-(2-hydroxyhexafluoroisopropyl) styrene in which the hydroxyl group is protected by the protecting group $R^8$.

In the case of using the styrene derivative represented by the general formula (6) or the another styrene derivative containing —$R^9$—$OR^7$ substituted for —$OR^7$, the resulting fluorine-containing copolymer is improved in adhesion to its substrate (e.g., glass substrate or silicon substrate). For achieving this improvement, the monomer (B) is preferably a hydroxystyrene or 4-(2-hydroxyhexafluoroisopropyl) styrene.

In the preparation of the fluorine-containing copolymer, the molar ratio of the monomer (A) to the monomer (B) is not particularly limited. This molar ratio can be adjusted within a range of from 0.1/99.9 to 99.9/0.1 depending on the use of the fluorine-containing copolymer. With this adjustment, it is possible to achieve a precise control of the properties of the fluorine-containing copolymer. For example, the molar ratio may be 1/1.

The method of polymerization for producing the fluorine-containing copolymer is not particularly limited. It can be a known polymerization such as anionic polymerization, radical polymerization, ion polymerization or coordination polymerization. Of these, radical polymerization or anionic polymerization is preferably used. The polymerization can be conducted by a known manner such as bulk polymerization, solution polymerization, suspension polymerization or emulsion polymerization by a batch-wise, half-continuous or continuous operation.

The temperature for conducting the polymerization can be adjusted depending on the polymerization method, polymerization manner and particularly the type of the polymerization initiator. It is generally preferably 20–200° C., particularly preferably 50–140° C.

The reaction vessel for conducting the polymerization is not particularly limited.

It is optional to use a polymerization solvent in the polymerization. The polymerization solvent is preferably one that does not interfere with the polymerization. Its typical examples are ketones such as acetone and methyl isobutyl ketone; aromatic solvents such as toluene, xylene and benzene; cyclic hydrocarbon solvents such as cyclopentene and cyclohexane; alcohols such as isopropyl alcohol, t-butanol and ethylene glycol monomethyl ether; and esters such as methyl acetate, ethyl acetate and n-butyl acetate. Furthermore, it is possible to use a molecular weight adjusting agent, such as mercaptan, in the polymerization.

The radical polymerization initiator is not particularly limited. Its examples are azo compounds, peroxides and redox compounds. Of these, azobisbutyronitrile, t-butylperoxypivalate and benzoyl peroxide are preferable.

The copolymerization may be conducted by radical emulsion polymerization, as stated above, using an emulsifying agent. This emulsifying agent may be an anion or nonion emulsifying agent, Examples of the anion emulsifying agent are alkylbenzenesulfonate, alkylsulfate, polyoxyethylenealkylphenolsulfate, styrenesulfonate, vinylsulfate, and derivatives of these. These salts may be produced by the interaction of the acids (e.g., alkylsulfuric acid) and bases (e.g., alkali metal hydroxides and volatile bases). Examples of the volatile bases are ammonia and triethylamine. Examples of the above-mentioned nonion emulsifying agent are polyoxyethylenealkylphenolethers, polyoxyethylenealkylethers, polyoxyethylene higher fatty acid esters, ethyleneoxide-propyleneoxide block copolymers, fluoroalkylcarboxylates, and fluoroalkylsulfates. The radical polymerization initiator usable in the emulsion polymerization is not limited to a particular type, as long as it is usable in a common emulsion polymerization. A water-soluble initiator is particularly preferably used.

Examples of the water-soluble initiator are inorganic peroxides such as hydrogen peroxide; organic peroxides such as cumene hydroperoxide, benzoyl peroxide, t-butyl hydroperoxide, disuccinic acid peroxide, and diglutaric acid peroxide; persulfates such as ammonium persulfate, potassium persulfate, and sodium persulfate; and azo-initiators such as hydrochloride of azobisisobutylamidine, azobisisobutyronitrile, and azobiscyanovaleric acid. Further examples of the water-soluble initiator are redox initiators which are combinations of the above-exemplified initiators and reducing agents such as sodium sulfite, sodium thiosulfate, sodium bisulfite, sodium metabisulfite, sodium bithiosulfate, formaldehyde sodium sulfoxylate, and reducing sugar. To the redox initiator, it is optional to add a small amount of iron, ferrous salt, silver sulfate, copper sulfate, and the like. The radical polymerization initiator may be added at one time or several times.

The solvent for conducting the radical polymerization in a solution is not particularly limited and can be selected in view of the solubility of the monomers and that of the resulting polymer. It can be selected from conventional polymerization solvents such as toluene, xylene and butyl acetate.

As stated above, the copolymerization may be conducted by anionic polymerization in a way of bulk polymerization or solution polymerization. The polymerization initiator for anionic polymerization is not particularly limited and can be selected from common ones. Its examples are commercial organic lithium compounds such as n-butyllithium and t-butyllithium; and other stable lithium compounds such as diphenylhexyllithium. Further preferable examples are metal alkoxides such as sodium methoxide, potassium methoxide, sodium ethoxide, potassium ethoxide, sodium isopropoxide, potassium isopropoxide, sodium-t-butoxide, and potassium-t-butoxide; nitrogen-containing heterocyclic compounds such as pyridine, picoline, lutidine, and piperidine; and amines such as triethylamine, tributylamine and triethanolamine.

After the copolymerization, it is possible to remove the reaction medium (i.e., organic solvent or water) from the solution or dispersion of the fluorine-containing copolymer by a known method. For example, it can be conducted by reprecipitation followed by filtration, or by heating under vacuum to distill the medium off.

The fluorine-containing copolymer according to the present invention may have a number average molecular weight of 1,000–1,000,000, preferably 10,000–500,000. If it is less than 1,000, the copolymer may become inferior in strength as a polymer compound. If it exceeds 1,000,000, the copolymer may become insufficient in solubility in solvent.

The following nonlimitative Examples are illustrative of the present invention. Hexafluoroisopropyl-α-trifluoromethylacrylate (HFIPTFMA), which was used in Examples 1–2, 4 and 9–10 and is represented by the following formula (8), and trifluoroethyl-α-trifluoromethylacrylate (TFETFMA), which was used in Examples 3 and 5–8 and is represented by the formula (9), had been prepared in accordance with the disclosure of Japanese Patent Unexamined Publication Showa 60-42352.

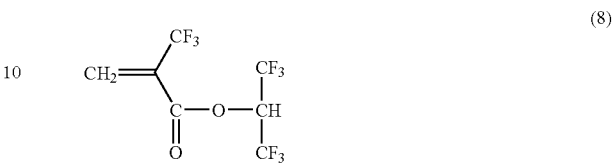

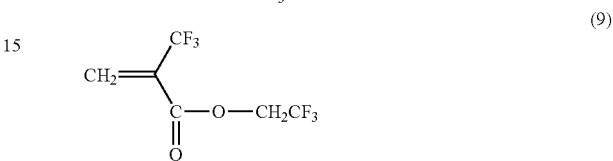

Furthermore, 4-(2-hydroxyhexafluoroisopropyl)styrene (HyHxFSt), which was used in Example 7 and is represented by the following formula (10), had been prepared from 4-chloro-styrene and hexafluoroacetone in accordance with J. Macromol. Sci.-Chem., A21 (1984), pp. 118–1216.

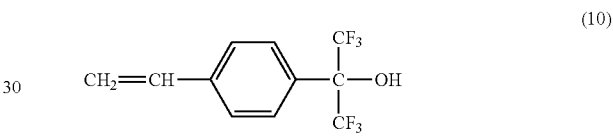

Still furthermore, all ethoxymethylated hydroxystyrene (EM hydroxystyrene), which was used in Example 8 and is represented by the following formula (11), and an ethoxymethylated 4-(2-hydroxyhexafluoroisopropyl)styrene (EMHyHxFSt), which was used in Example 9 and is represented by the following formula (12), had been prepared by a known method for synthesizing alkoxyalkyl ethers (J. Am. Chem. Soc., 94, 7827 (1972).

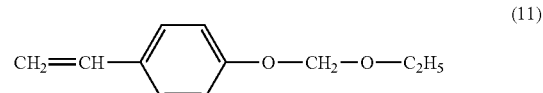

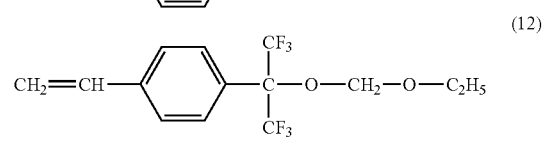

EXAMPLE 1

A glass reactor equipped with a stirrer was charged with 10.0 g (35 mmol) of hexafluoroisopropyl-α-trifluoromethylacrylate (HFIPTFMA), 3.5 g (36 mmol) of isobutyl vinyl ether (IBVE), 0.12 g (0.69 mmol) of t-butylperoxypivalate (P-PV), and 20 ml of toluene. Then, the atmosphere of the glass reactor was replaced with nitrogen. Then, the temperature of the glass reactor was gradually increased, and the reaction was conducted at 60° C. for 16 hr with stirring. After the reaction, the reaction solution was introduced into 500 ml of n-hexane, thereby obtaining a resin in the form of precipitate. The obtained resin was separated by filtration, followed by vacuum drying at 70° C., thereby obtaining 8.5 g of the target polymer (yield: 63%) in the form of a white solid. A part of the obtained resin was dissolved in tetrahydrofuran, and its molecular weight was measured by gel permeation chromatography (G.P.C) using polystyrene as a standard substance. With this, it was found that number average molecular weight (Mn) was 132,000, weight average molecular weight (Mw) was 229,000, and the molecular weight dispersion (Mw/Mn) was 1.7. The molar ratio of the monomer (A) to the monomer (B) in the copolymer was found to be about 1/1 by measuring nuclear magnetic resonance (NMR) spectrum. The reaction conditions are shown in Table 1, and the properties of the obtained copolymer are shown in Table 2. The copolymer was soluble in acetone, methyl isobutyl ketone (MIBK) and tetrahydrofuran, but was insoluble in n-hexane.

TABLE 1

| | Monomer (A) g (mmol) | Monomer (B) g (mmol) | Initiator g (mmol) | Initiator Concentration (%) | Solvent (ml) | Reaction Temp. (° C.) | Reaction Time (hr) |
|---|---|---|---|---|---|---|---|
| Ex. 1 | HFIPTFMA 10.0 (35) | IBVE 3.5 (35) | P-PV 0.12 (0.69) | 1.00 | Toluene 20 | 60 | 16 |
| Ex. 2 | HFIPTFMA 10.0 (35) | HBAE 4.5 (35) | P-PV 0.12 (0.69) | 1.00 | Toluene 20 | 60 | 18 |
| Ex. 3 | TFETFMA 10.3 (46) | Allyl Acetate 4.7 (47) | AIBN 0.038 (0.23) | 0.25 | n-Butylacetate 15 | 60 | 18 |
| Ex. 4 | HFIPTFMA 10.0 (35) | Vinyl Acetate 3.0 (35) | P-PV 0.12 (0.69) | 1.00 | Toluene 20 | 60 | 16 |
| Ex. 5 | TFETFMA 10.3 (46) | Styrene 4.8 (46) | AIBN 0.076 (0.46) | 0.50 | Toluene 20 | 65 | 5 |
| Ex. 6 | TFETFMA 10.3 (46) | Hydroxystyrene 5.5 (46) | AIBN 0.076 (0.46) | 0.50 | Toluene 20 | 65 | 15 |
| Ex. 7 | TFETFMA 6.8 (31) | HyHxFSt 8.3 (31) | AIBN 0.025 (0.15) | 0.25 | n-Butylacetate 15 | 65 | 20 |
| Ex. 8 | TFETFMA 6.8 (31) | EM hydroxystyrene 5.5(31) | AIBN 0.025 (0.15) | 0.25 | n-Butylacetate 15 | 65 | 18 |
| Ex. 9 | HFIPTFMA 7.8 (27) | EMHyHxFSt 8.8 (27) | AIBN 0.022 (0.13) | 0.25 | n-Butylacetate 15 | 65 | 20 |
| Ex. 10 | HFIPTFMA 10.0 (35) | TFEMA 5.8 (3.5) | P-PV 0.12 (0.69) | 1.00 | None | 60 | 64 |

HFIPTFMA: hexafluoroisopropyl-α-trifluoromethylacrylate; IBVE: isobutyl vinyl ether; P-PV: t-butylperoxypivalate; HBAE: hydroxybutyl allyl ether; TFETFMA: trifluoroethyl-α-trifluoromethylacrylate; AIBN: azobisbutyronitrile; HyHxFSt: 4-(2-hydroxyhexafluoroisopropyl)styrene; EM hydroxystyrene: ethoxymethylated hydroxystyrene; EMHyHxFSt: ethoxymethylated 4-(2-hydroxyhexafluoroisopropyl)styrene; and TFEMA: 2,2,2-trifluoroethyl methacrylate.

TABLE 2

| | Yield (g) | Yield (%) | Mn | Mw | Mw/Mn | Molar Ratio of Monomer (A) to Monomer (B) in Copolymer |
|---|---|---|---|---|---|---|
| Ex. 1 | 8.5 | 63 | 132,000 | 229,000 | 1.7 | 1/1 |
| Ex. 2 | 7.5 | 52 | 80,000 | 124,000 | 1.6 | 1/1 |
| Ex. 3 | 11.8 | 79 | 24,000 | 41,000 | 1.7 | 1/1 |
| Ex. 4 | 11.4 | 88 | 31,000 | 48,000 | 1.5 | 1/1 |
| Ex. 5 | 7.5 | 50 | 78,000 | 103,000 | 1.3 | 1/1 |
| Ex. 6 | 8.2 | 52 | 90,000 | 144,000 | 1.6 | 1/1 |
| Ex. 7 | 13.3 | 88 | 149,000 | 203,000 | 1.4 | 1/1 |
| Ex. 8 | 10.6 | 86 | 101,000 | 143,000 | 1.4 | 1/1 |
| Ex. 9 | 11.1 | 67 | 132,000 | 175,000 | 1.3 | 1/1 |
| Ex. 10 | 7.1 | 45 | 78,000 | 105,000 | 1.3 | 2/8 |

EXAMPLES 2–10

In each of Examples 2–10, Example 1 was repeated except in that the reaction conditions were changed as shown in Table 1. The results are shown in Table 2. In each of Examples 2–10, the copolymer was soluble in acetone, methyl isobutyl ketone (MIBK) and tetrahydrofuran, but was insoluble in n-hexane.

The entire contents of Japanese Patent Application No. 2000-402897 filed on Dec. 28, 2000, are incorporated herein by reference.

What is claimed is:

1. A fluorine-containing copolymer comprising:
   a first unit derived from an α-trifluoromethyl acrylic ester represented by the following general formula (1); and
   a second unit derived from a vinyl ether that is selected from the group consisting of propyl vinyl ether, isopropyl vinyl ether, sec-butyl vinyl ether, t-butyl vinyl ether, pentyl vinyl ether, isoamylcyclohexyl vinyl ether, hexyl vinyl ether, phenyl vinyl ether, decyl vinyl ether, methylcyclokexyl vinyl ether, benzyl vinyl ether, phenethyl vinyl ether, tolyl vinyl ether, a fluoroalkyl vinyl ether, a hydroxyl group-containing vinyl ether, an epoxy group-containing vinyl ether, a β-ketoester group-containing vinyl ether, and a hydrolyzable group-containing and silicon-containing vinyl ether,

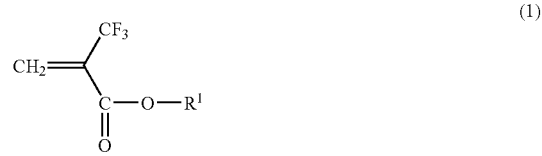

(1)

where R$^1$ an organic group containing at least one fluorine atom, wherein the vinyl ether is selected from the group consisting of a fluoroalkyl vinyl ether, a hydroxyl group-containing vinyl ether, an epoxy group-containing vinyl ether, a β-ketoester group-containing vinyl ether, and a hydrolyzable group-containing and silicon-containing vinyl ether.

2. A fluorine-containing copolymer according to claim 1, wherein the fluoroalkyl vinyl ether selected from the group consisting of 1,1,1-trifluoroethyl vinyl ether, 2,2-difluoroethyl vinyl ether, tetrafluoroethyl vinyl ether, 2,2,3,3-tetrafluoropropyl vinyl ether, 2,2,3,3,4,4,5,5- octafluoropentyl vinyl ether, and 2,2,3,3,4,4,5,5,6,6,7,7,8,8, 9,9-hexadecafluorononyl vinyl ether.

3. A flourine-containing copolymer according to claim 1, wherein the hydroxyl group-containing vinyl ether is selected from the group consisting of hydroxymethyl vinyl ether, 2-hydroxyethyl vinyl ether, 3-hydroxypropyl vinyl ether, 4-hydroxybutyl vinyl ether, 5hydroxypentyl vinyl ether, 6-hydroxyhexyl vinyl ether, diethylene glycol monovinyl ether, polyethylene glycol monovinyl ether, and 1,4-cyclohexanedimethanol vinyl ether.

4. A fluorine-containing copolymer comprising, a first unit derived from an α-trifluoromethyl acrylic ester represented by the following general formula (1); and a second unit derived from a vinyl ether that is selected from the group consisting of propyl vinyl ether, isopropyl vinyl ether, sec-butyl vinyl ether, t-butyl vinyl ether, pentyl vinyl ether, isoamylcyclohexyl vinyl ether, hexyl vinyl ether, phenyl vinyl ether, decyl vinyl ether, methylcyclohexyl vinyl ether, benzyl vinyl ether, phenethyl vinyl ether, tolyl vinyl ether, a fluoroalkyl vinyl ether, a hydroxyl group-containing vinyl ether, an epoxy group-containing vinyl ether, a β-ketoester group-containing vinyl ether, and a hydrolyzable group-containing and silicon-containing vinyl ether.

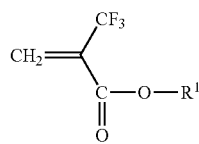

(1)

where $R^1$ is an organic group containing at least one fluorine atom, wherein the vinyl ether is a perfluoroalkyl vinyl ether represented by the formula $CF_2=CF(OR^2)$ where $R^2$ is a perfluorolalkyl group, and wherein the perfluoroalkyl vinyl ether is selected from the group consisting of perfluoromethyl vinyl ether, perflouropropyl vinyl ether.

5. A flourine-containing copolymer comprising:

a first unit derived from an α-trifluoromethyl acrylic ester represented by the following general formula (1); and a second unit derived from a vinyl ether that is selected from the group consisting of propyl vinyl ether, isoproply vinyl ether, sec-butyl vinyl ether, t-butyl vinyl ether, pentyl vinyl ether, isoamylcyclohexyl vinyl ether, hexyl vinyl ether, phenyl vinyl ether, decyl vinyl ether, methylcyclohexyl vinyl ether, benzyl vinyl ether, phenethyl vinyl ether, tolyl vinyl ether, a fluoroalkyl vinyl ether, a hydroxyl group-containing vinyl ether, an epoxy group-containing vinyl ether, a β-ketoester group-containing vinyl ether, and a hydrolyzable group-containing and silicon-containing vinyl ether,

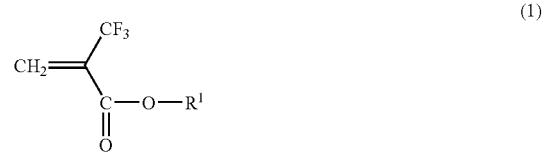

where $R^1$ is an organic group containing at least one fluorine atom, wherein the α-trifluoromethyl acrylic ester is hexafluoroisopropyl-α-trifluoromethylacrylate, and wherein the vinyl ether is isobutyl vinyl ether.

* * * * *